United States Patent [19]
Grossman et al.

[11] 3,828,292
[45] Aug. 6, 1974

[54] TEMPERATURE COMPENSATING THERMAL RELAY

[75] Inventors: David H. Grossman, Mount Royal, Quebec; Charles T. Plough, Beaconsfield, Quebec, both of Canada

[73] Assignee: Multi-State Devices Ltd., Dorval, Quebec, Canada

[22] Filed: Aug. 3, 1973

[21] Appl. No.: 385,239

[52] U.S. Cl. ............................... 337/417, 219/504
[51] Int. Cl. ......................................... H01h 37/02
[58] Field of Search ................... 219/501, 504, 505; 337/417

[56] References Cited
UNITED STATES PATENTS

| 3,662,149 | 5/1972 | Lipinski | 219/505 |
| 3,715,563 | 2/1973 | Bloch | 219/504 |

Primary Examiner—J. D. Miller
Assistant Examiner—Fred E. Bell
Attorney, Agent, or Firm—Spencer & Kaye

[57] ABSTRACT

A temperature compensating thermal relay comprises an input heater element mounted on a heat storage device and adapted to be connected to a source of control signals, a temperature dependent output resistance element mounted on the same heat storage device as the heater element but which may be electrically isolated therefrom, and adapted to be connected in an electrical output circuit which is controlled by the control signal but with a predetermined delay with respect to both the turning on and the turning off of the control signal depending on the mass of the storage device. The heat storage device is provided with partial thermal isolation with respect to the ambient so as to permit to vary by different amounts depending on the ambient temperature the time delay between the tuning on of the control signal and operation of the controlled circuit and the time delay between turning off of the control signal and operation of the controlled circuit.

7 Claims, 4 Drawing Figures

PATENTED AUG 6 1974　　　　　　　　　　　　　　　　　3,828,292

TEMPERATURE COMPENSATING THERMAL RELAY

This invention relates to a temperature compensating thermal relay.

It is known to provide electrical control devices using thermal relays comprising two thermally coupled temperature dependent resistance elements located, one in a control circuit, and the other in a separate controlled circuit. The controlled circuit is thus operated in accordance with the signal applied to the control circuit.

It is the object of the present invention to provide a thermal relay of the above type which is temperature compensating, that is a relay which, in response to a control signal having a predetermined time duration, will automatically provide an output signal having a time duration which depends on the ambient temperature.

The temperature compensating thermal relay, in accordance with the present invention, comprises an input heater element mounted on a heat storage device and adapted to be connected to a source of control signals, a temperature dependent output resistance element mounted on the same heat storage device as the heater element (but which may be electrically isolated therefrom) and adapted to be connected in an electrical output circuit intended to be controlled by the control signal but with a predetermined delay with respect to the control signal for both the turning on and the turning off of the output circuit depending on the mass of the storage device, and means for providing partial thermal isolation of the heat storage device with respect to the ambient so as to permit to vary by different amounts the time delay between turning on of the control signal and operation of the output controlled circuit, and the time delay between turning off of the control signal and operation of the output controlled circuit, thereby controlling the time duration of the output signal in accordance with the ambient temperature.

The heat storage device may vary in shape but is normally a thermally conductive substrate or base such as aluminum, copper, beryllium oxide, etc. upon which the input heater and the temperature dependent output resistance element are mounted.

The input heater element may be a positive temperature coefficient device which, when fed with a potential of predetermined value, adjusts its resistance such that its surface temperature increases to a fixed value and thus heats the substrate to approximately the same fixed temperature value.

If a normally closed relay is desired, the temperature dependent output resistance element will be a positive temperature coefficient device whose resistance increases with temperature to a value such that the electrical circuit is deenergized. On the other hand, if the relay desired is a normally open relay, the temperature dependent resistance element will be a negative temperature coefficient device whose resistance decreases with temperature to a value such that the electrical relay is energized.

The means for providing partial thermal isolation of the substrate may be a layer of heat insulating material such as glass, epoxy, mica, etc. separating such substrate from a heat sink exposed to the ambient temperature.

The invention will now be disclosed, by way of example, with reference to the description of a preferred embodiment thereof illustrated in the accompanying drawings in which.

Figure 1:
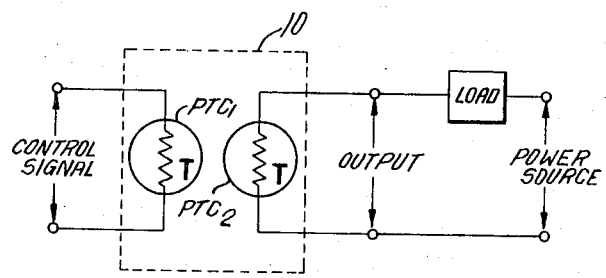
FIG. 1 illustrates a thermal relay in accordance with the invention placed in an electrical circuit for controlling such circuit.

Referring to FIG. 1, there is shown the electrical circuit which uses the thermal relay 10 in accordance with the invention. Such relay comprises two positive temperature coefficient devices PTC1 and PTC2. The PTC1 device is adapted for connection to a source of control signals which may be a train of rectangular pulses. The PTC2 device is connected in an electrical circuit for controlling a load, such as a timer controlling the heater of a dryer. The PTC1 and PTC2 devices are shown as being electrically isolated but one side of the devices may be common.

Figure 2:
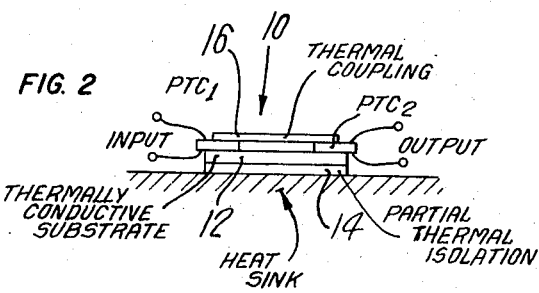
FIG. 2 illustrates a schematic diagram of the thermal relay in accordance with the invention.

Referring to FIG. 2, the positive temperature coefficient devices PTC1 and PTC2 are mounted on a thermally conductive substrate or base 12 which thermally couples the PTC1 and PTC2 devices. The substrate is connected to the ambient temperature through a layer of material 14 which provides partial thermal isolation. The top of the PTC1 and PTC2 devices may also be coupled with a piece of thermally conductive material. The thermally conductive materials 12 and 16 may be provided with electrically non conductive layers on the portions thereof contacting the two PTC devices so as to provide electrical isolation between the two PTC1 and PTC2 devices.

Figure 3:
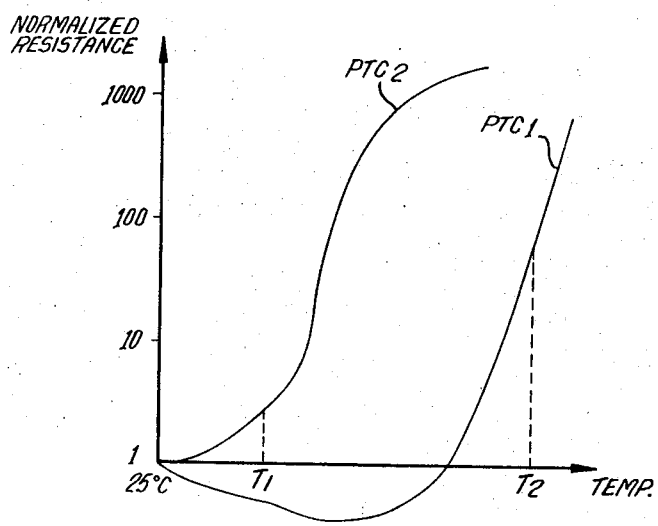
FIG. 3 illustrates the resistance-temperature characteristics of the positive temperature coefficient devices used in the thermal relay in accordance with the invention.

FIG. 3 shows sketches of the relative resistance of the two PTC1 and PTC2 devices as a function of temperature. The curves are plotted in normalized form. The PTC1 device acts as a heater and must be such that when a predetermined voltage is applied thereto, it adjusts its resistance such that its surface temperature increases to a fixed value. This is shown as temperaure $T_2$ in FIG. 3. When attached to a thermally conductive substrate, the substrate will be heated to approximately the same temperature as the surface of the PTC1 device. It is to be understood that any heater capable of maintaining a temperature of fixed value, when energized, would be suitable.

The PTC2 device is also thermally connected to the thermally conductive substrate. It may be electrically isolated from PTC1 device. It has a resistance-temperature characteristic as shown in FIG. 3. At any temperature below $T_1$, the output of the PTC2 device exhibits a low resistance value corresponding to the ON condition of the electrical circuit. As the thermally conductive substrate heats up, the resistance of the PTC2 device increases according to its characteristic curve. The maximum resistance ratio can typically be between 20:1 and 2000:1. At a high resistance value, the load may be considered as being deenergized. It is to be understood that the positive temperature coefficient device PTC2 may be replaced by a negative temperature coefficient device when a normally closed relay is required.

Figure 4:
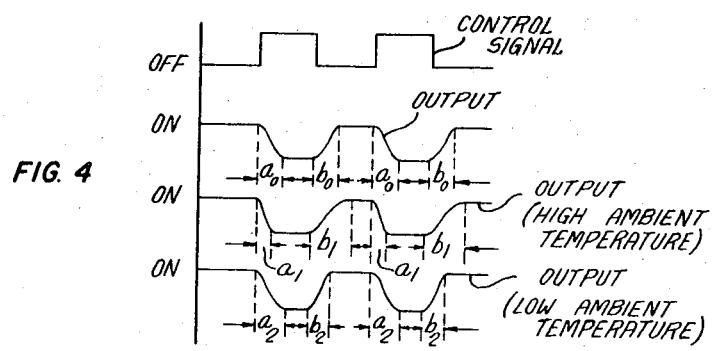
FIG. 4 illustrates the control signal as well as the output signals of the thermal relay in accordance with the invention depending on the ambient temperature.

As illustrated in FIG. 4, there is a delay $a_0$ between the application of power to the PTC1 device and the attainment of any given value of resistance by device PTC2. This delay is determined by the mass and thermal parameters of the thermally conductive substrate 12 which acts as a heat storage device, and also by the losses to the ambient. The losses to the ambient are determined to a large extent by the partial thermal isolation 14 which acts as a thermal resistor.

When power is removed from the PTC1 device, the heat stored in the substrate 12 is transferred to the ambient largely through the partial thermal isolation 14, and the substrate temperature decays at a rate determined by the mass and thermal parameters of the substrate and the thermal resistance of the partial thermal isolation 14. FIG. 4 shows a time delay $b_0$ between removal of power from the PTC1 device and full reenergization of the electrical circuit.

Thermal paths to the ambient other than the partial thermal isolation 14 may exist; these can be taken into account in determining the rates of heat charge and discharge of the substrate 12.

The initial or starting temperature before power is applied to the PTC1 device is determined by the ambient temperature. As the ambient temperature increases, the change in temperature required for a given change in resistance of device PTC2 decreases and, consequently, the time delay also decreases. This is illustrated in FIG. 4 by delay $a_1$. Similarly, the final temperature to which the substrate decays after removing power is determined by the ambient temperature. Therefore, as the temperature increases the temperature to which the substrate decays after removal of heat is higher. This, in accordance with the equations governing the decay of heat, means that it will take a longer time to reach any given temperature and any given resistance thereby increasing the time delay. This is shown by time delay $b_1$ in FIG. 4. The above argument holds in reverse when the temperature is decreased, thus providing ambient temperature control of the time delay as is shown by the time delays $a_2$ and $b_2$ in FIG. 4. It will therefore be seen that an increase in ambient temperature reduces the ON time of the electrical relay, whereas a decrease of the ambient temperature increases the ON time of the relay. This is a characteristic which is certainly desirable for a control device operating timers for dryer heaters.

Although the invention has been disclosed with reference to a preferred embodiment thereof, it is to be understood that various modifications may be made thereto within the spirit of the invention. For example, the heat storage device does not necessarily have to be a substrate. It could be any suitable base. In addition, the heater device does not necessarily have to have a positive temperature coefficient. Furthermore, the temperature dependent resistance element mounted in the electrical circuit may have a positive or negative temperature coefficient depending on whether a normally closed or normally open relay is required.

We claim:
1. A temperature compensating thermal relay comprising:
   a. an input heater element mounted on a heat storage device and adapted to be connected to a source of control signals;
   b. a temperature dependent output resistance element mounted on the same heat storage device as said input heater element and adapted to be connected in an electrical circuit which is controlled in accordance with the control signal but with a predetermined delay with respect to both the turning on and turning off of the control signal depending on the mass of the storage device; and
   c. means for providing partial thermal isolation of said heat storage device with respect to the ambient, whereby the amounts of delay between the turning on of the control signal and operation of the electrical output circuit, and between turning off of the control signal and operation of the electrical output circuit vary depending upon the ambient temperature.

2. A temperature compensating thermal relay as defined in claim 1, wherein said input heater element is electrically isolated from said output resistance element.

3. A temperature compensating thermal relay as defined in claim 1, wherein said heat storage device is a thermally conductive substrate.

4. A temperature compensating thermal relay as defined in claim 3, wherein said input heater element is a positive temperature coefficient device which, when fed with a potential of predetermined value, adjusts its resistance such that its surface temperature increases to a fixed value and thus heats the substrate to approximately the same fixed temperature value.

5. A temperature compensating thermal relay as defined in claims 1, wherein said temperature depencent output resistance element is a positive temperature coefficient device whose resistance increases with temperature to a value such that said electrical circuit is deenergized.

6. A temperature compensating thermal relay as defined in claims 1, wherein said temperature dependent output resistance element is a negative temperature coefficient device whose resistance decreases with temperature to a value such that said electrical circuit is energized.

7. A temperature compensating thermal relay as defined in claim 3, wherein said means for providing partial thermal isolation of said substrate is a layer of heat insulating material separating said substrate from a heat sink exposed to the ambient temperature.

* * * * *